US008047694B2

(12) United States Patent
Lee et al.

(10) Patent No.: US 8,047,694 B2
(45) Date of Patent: Nov. 1, 2011

(54) ADAPTIVE FRONT LIGHT SYSTEM HAVING HIGH HEAT-DISSIPATION EFFICIENCY

(75) Inventors: Dae Min Lee, Incheon (KR); Jung Wook Lim, Seoul (KR)

(73) Assignee: Hyundai Motor Company, Seoul (KR)

( * ) Notice: Subject to any disclaimer, the term of this patent is extended or adjusted under 35 U.S.C. 154(b) by 396 days.

(21) Appl. No.: 12/274,184

(22) Filed: Nov. 19, 2008

(65) Prior Publication Data

US 2009/0278461 A1 Nov. 12, 2009

(30) Foreign Application Priority Data

May 7, 2008 (KR) ........................ 10-2008-0042319

(51) Int. Cl.
*B60Q 1/04* (2006.01)

(52) U.S. Cl. ......................... 362/547; 362/294; 362/373

(58) Field of Classification Search .................. 362/547, 362/249.02, 294, 373

See application file for complete search history.

(56) References Cited

U.S. PATENT DOCUMENTS

2008/0247177 A1* 10/2008 Tanaka et al. ................. 362/373

FOREIGN PATENT DOCUMENTS

| | | | |
|---|---|---|---|
| JP | 2004311224 | A | 11/2004 |
| JP | 2006-294263 | A | 10/2006 |
| JP | 2007-035513 | A | 2/2007 |
| KR | 10-2004-0087886 | A | 10/2004 |
| KR | 10-2005-0120364 | A | 12/2005 |
| KR | 1020060054150 | A | 5/2006 |
| KR | 1020070029429 | A | 3/2007 |
| KR | 100756714 | B1 | 9/2007 |

* cited by examiner

*Primary Examiner* — David V Bruce

(74) *Attorney, Agent, or Firm* — Morgan, Lewis & Bockius LLP

(57) ABSTRACT

An adaptive front lighting system (AFLS) having a high heat-dissipation efficiency increases heat-dissipation efficiency of a light emitting diode (LED) to improve durability in headlamps which use LEDs as a light source and have a variable illumination angle according to conditions. The AFLS includes a lamp housing, a reflector installed in the lamp housing and rotatable around a rotational axle formed at the lamp housing, a light source installed in the reflector to emit light, an external heat sink installed at an external surface of the lamp housing so as to dissipate heat towards outside of the lamp housing, and/or a heat conduction member connecting the light source and the external heat sink so as to transfer the heat of the light source to the external heat sink. The heat conduction member is flexibly transformed in response to a movement of the reflector and the light source.

13 Claims, 5 Drawing Sheets

ADAPTIVE FRONT LIGHT SYSTEM HAVING HIGH HEAT-DISSIPATION EFFICIENCY

CROSS-REFERENCE TO RELATED APPLICATION

This application claims the benefit and priority of Korean Patent Application No. 10-2008-0042319 filed May 7, 2008, the entire contents of which applications is incorporated herein for all purposes by this reference.

BACKGROUND OF THE INVENTION

1. Field of the Invention

The present invention relates to an adaptive headlight system of a vehicle, and more particularly to an adaptive front light system (AFLS) having high heat-dissipation efficiency, which increases heat-dissipation efficiency of a light emitting diode (LED) to improve durability in a headlight, which uses the LED as a light source and has a variable illumination angle according to conditions.

2. Description of Related Art

In general, headlights mounted on a vehicle have fixed illumination angle, and thus always illuminate the road ahead of the vehicle regardless of the driving conditions.

Consequently, the headlights of a vehicle running along a curved road can disturb an oncoming driver's view of the vehicle on the opposite lane (hereinafter, referred to as "oncoming vehicle"), and the driver himself/herself cannot properly secure clear visibility of the driving curved road so that the driver's safety is often jeopardized or endangered.

In order to cope with this situation, there has recently been developed a device that the headlights move in the left or right direction depending on the angle at which the driver turns a steering wheel in order to secure the proper visibility of the driver at night and prevent glaring headlights of the oncoming vehicle.

Furthermore, a vehicle is experiencing a nose-up phenomenon that the front portion of the vehicle is instantaneously raised at the fast acceleration and a nose-down phenomenon that the front portion of the vehicle is instantaneously lowered because of the hard braking. Due to these characteristics of the vehicle, the focus of the headlight can be located above or below the normal position at a moment, which is responsible for the glare of the oncoming vehicle or the driver's poor visibility.

FIG. 1 is a schematic view illustrating the heat dissipation structure of an adaptive front light system of the prior art.

As illustrated in FIG. 1, a reflector 20 is mounted in a lamp housing 10, the interior of which is sealed, so as to cause light to be reflected to travel forward the motor vehicle. As illustrated, the reflector 20 is provided with a light source 30 which emits light and a light emitting diode (LED) is frequently used as the light source 30 these days. The LED can be operated with low power and thus provides higher luminous efficiency than a bulb type with a high intensity of illumination. Further, the LED has a high degree of freedom in lamp design due to a smaller size compared with the bulb type, and has a semi-permanent lifespan only if the generated heat can be smoothly cooled down.

However, since the light source 30 using the LED generates a great deal of heat, the luminous efficiency is abruptly lowered without any proper means for the heat dissipation, and thus results in reducing the lifespan. For this reason, the light source 30 can be formed with a heat sink 40 as illustrated in FIG. 1 such that the generated heat from the light source 30 can be dissipated through the heat sink.

Here, the reflector 20 is adapted to rotate around a rotational axle 21 in leftward/rightward direction or in upward/downward direction. This is because the illumination angle of the headlight changes depending on the driving conditions of the vehicle.

For reference, an adaptive front light system (AFLS) refers to a system that adjusts the illumination angle of the headlight in a manner such that the reflector 20 rotates in the left and right direction according to the steering angle or upward and downward direction according to the height of the front portion of the vehicle.

However, since a heat dissipation structure is mounted inside the sealed lamp housing 10 in the adaptive headlight system of the prior art as above mentioned, the generated heat from the light source 30 cannot be properly dissipated outside via the heat sink 40 and is accumulated inside. Accordingly, the heat dissipation performance of the light source 30 gets worse. In detail, since the lamp housing 10 must be sealed to prevent moisture and dust from outside and the reflector 20 is adapted to rotate, the heat sink 40 cannot be installed outside the lamp housing 10 and should move together with the reflector 20. As such, the heat is not properly dissipated through the heat sink 40.

Particularly, this problem becomes more serious when a plurality of LEDs are installed in one lamp housing 10 in order to adjust luminous intensity of the headlight to the level of a high intensity discharge (HID) lamp.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Embodiments of the present invention has been made to solve the foregoing problems with the prior art, and therefore the present invention is directed to efficiently dissipate heat from a light source mounted on a rotating reflector in an adaptive front light system (AFLS).

One aspect of the present invention is directed to an adaptive front lighting system having high heat-dissipation efficiency, including a lamp housing, a reflector installed in the lamp housing and rotatable around a rotational axle formed at the lamp housing, a light source installed in the reflector to emit light, an external heat sink installed at an external surface of the lamp housing so as to dissipate heat towards outside of the lamp housing, and/or a heat conduction member connecting the light source and the external heat sink so as to transfer the heat of the light source to the external heat sink. The heat conduction member may be flexibly transformed in response to a movement of the reflector and the light source.

The heat conduction member may include one or more overlapping metal thin straps. The light source may include an internal heat sink. The light source may include a light emitting diode.

The adaptive front lighting system may further thermal compound portions applied to contact surfaces of the internal heat sink and the heat conduction member and to contact surfaces of the heat conduction member and the external heat sink.

The lamp housing may accommodate two or more of reflectors, two or more of light sources, and two or more of heat conduction members. The two or more heat conduction members may be connected to one of said external heat sinks.

The adaptive front lighting system may further include a cooling fan installed outside said one external heat sink.

The heat conduction member may include wire. The heat conduction member may include a chain and belt shapes. The heat conduction member may be coated with either carbon nanotubes or graphene having high thermal conductivity.

The adaptive front lighting system may further include thermal compound portions applied to contact surfaces of the internal heat sink and the heat conduction member and to contact surfaces of the heat conduction member and the external heat sink. The external heat sink may be formed with a fin so as to dissipate heat towards outside of the lamp housing. The heat conduction member may be made of aluminum, copper or carbon. The light source may include an internal heat sink, wherein one end of the internal heat sink may be connected with the heat conduction member and the other end of the internal heat sink may be connected with the light source.

The adaptive front lighting system may further include thermal compound portions applied to contact surfaces of the heat conduction member and the external heat sink.

According to the present invention as described above, the heat of the light source installed on the reflector, which can rotate in leftward/rightward and upward/downward directions, can be transmitted to the external heat sink exposed to the outside of the lamp housing through the heat conduction member and thus the problem of the heat transmission to the outside of the lamp housing in conjunction with the rotation of the light source is solved. Consequently, the heat dissipation efficiency of the light source is improved and the durability of the headlight is also increased. Particularly, the luminous efficiency and the intensity of illumination of the LED can be maintained for a long time.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
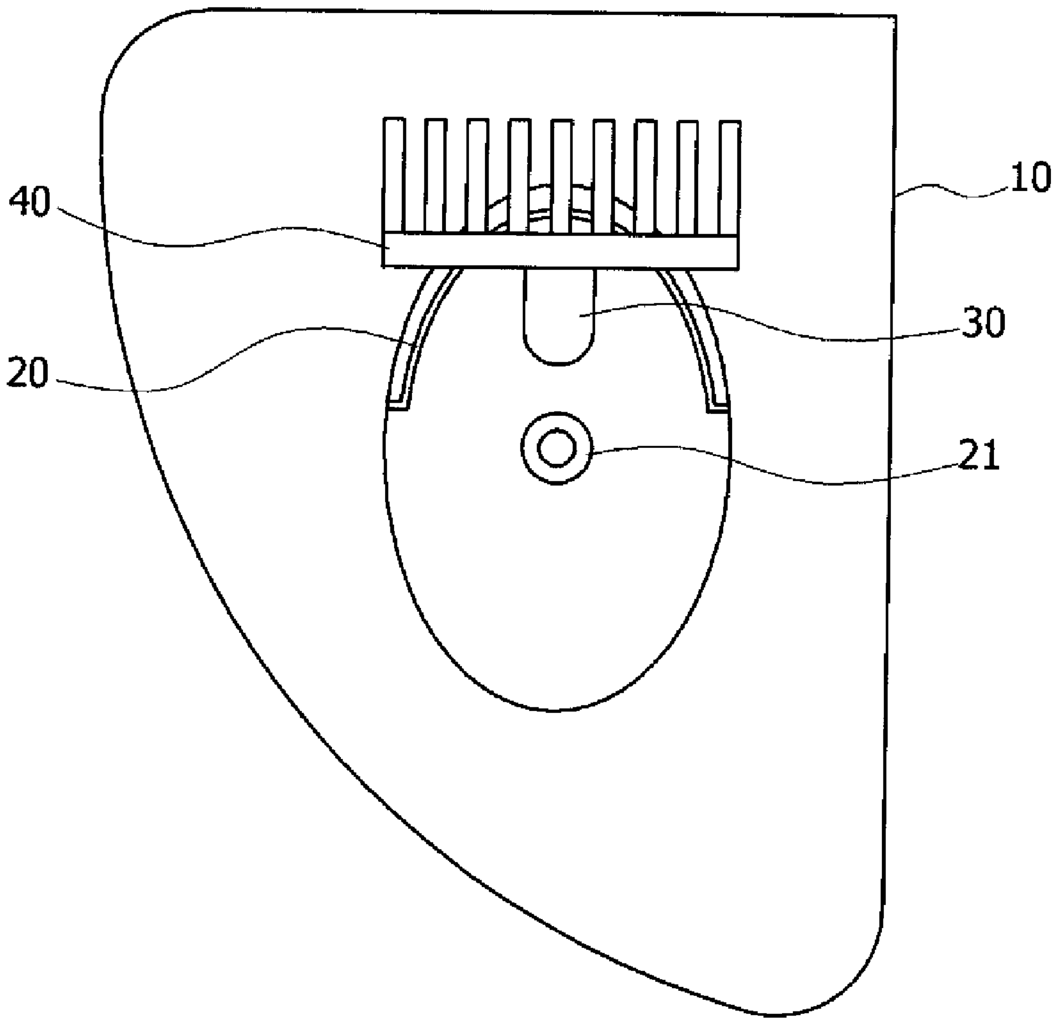
FIG. 1 is a schematic view illustrating the heat sink structure of an adaptive front light system.
Figure 2:
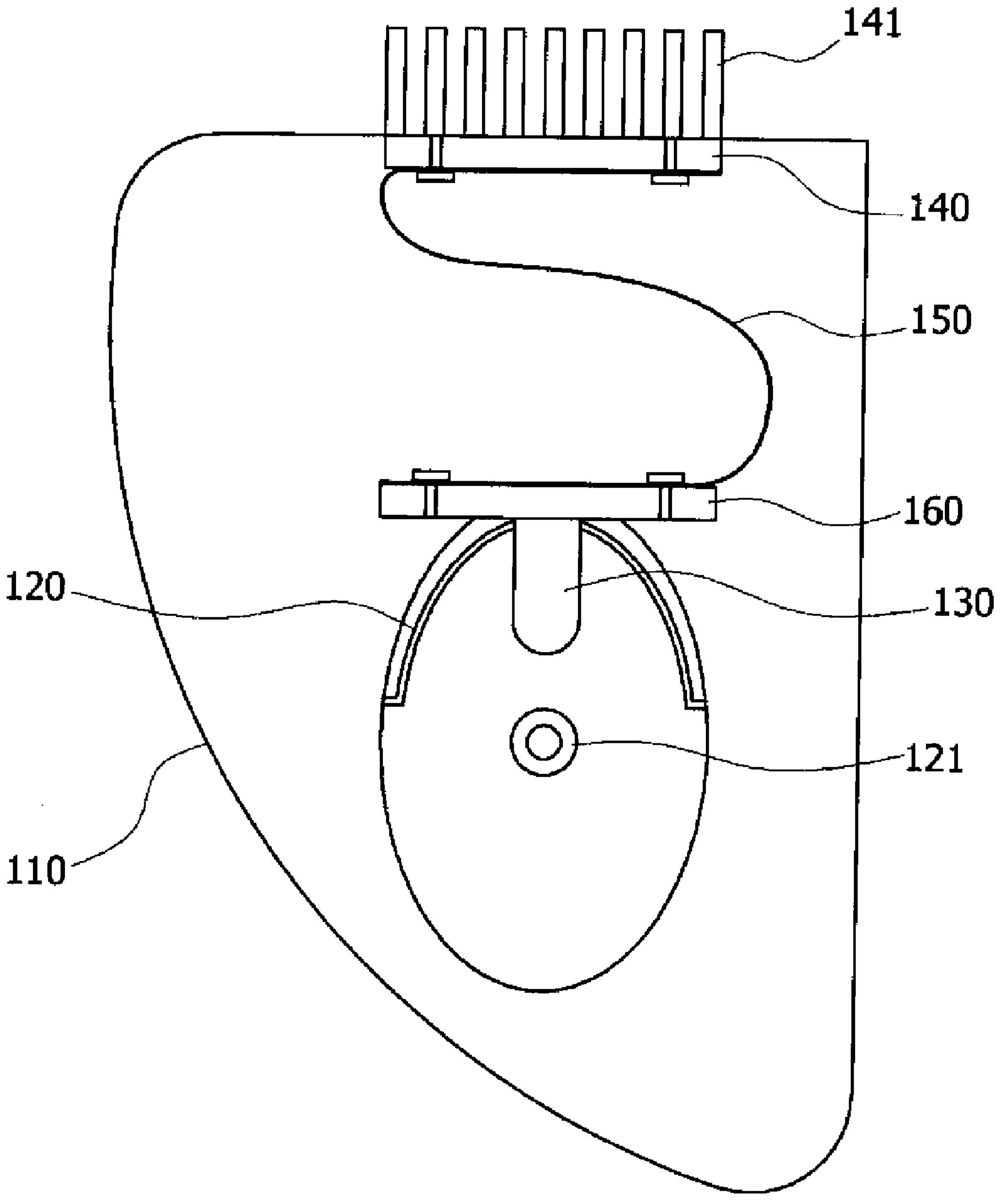
FIG. 2 is a schematic view illustrating a heat sink structure of an exemplary adaptive front headlight system (AFLS) according to the present invention.
Figure 3:
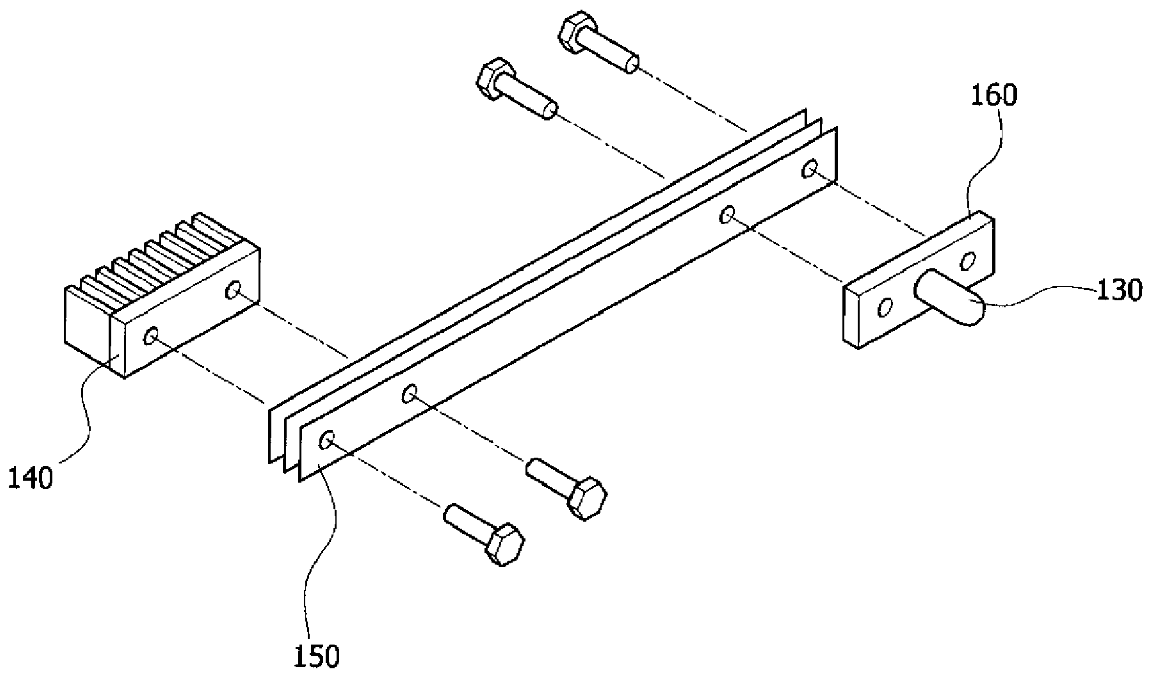
FIG. 3 is a perspective view illustrating the structure of an exemplary heat conduction member according to the present invention.
Figure 4:
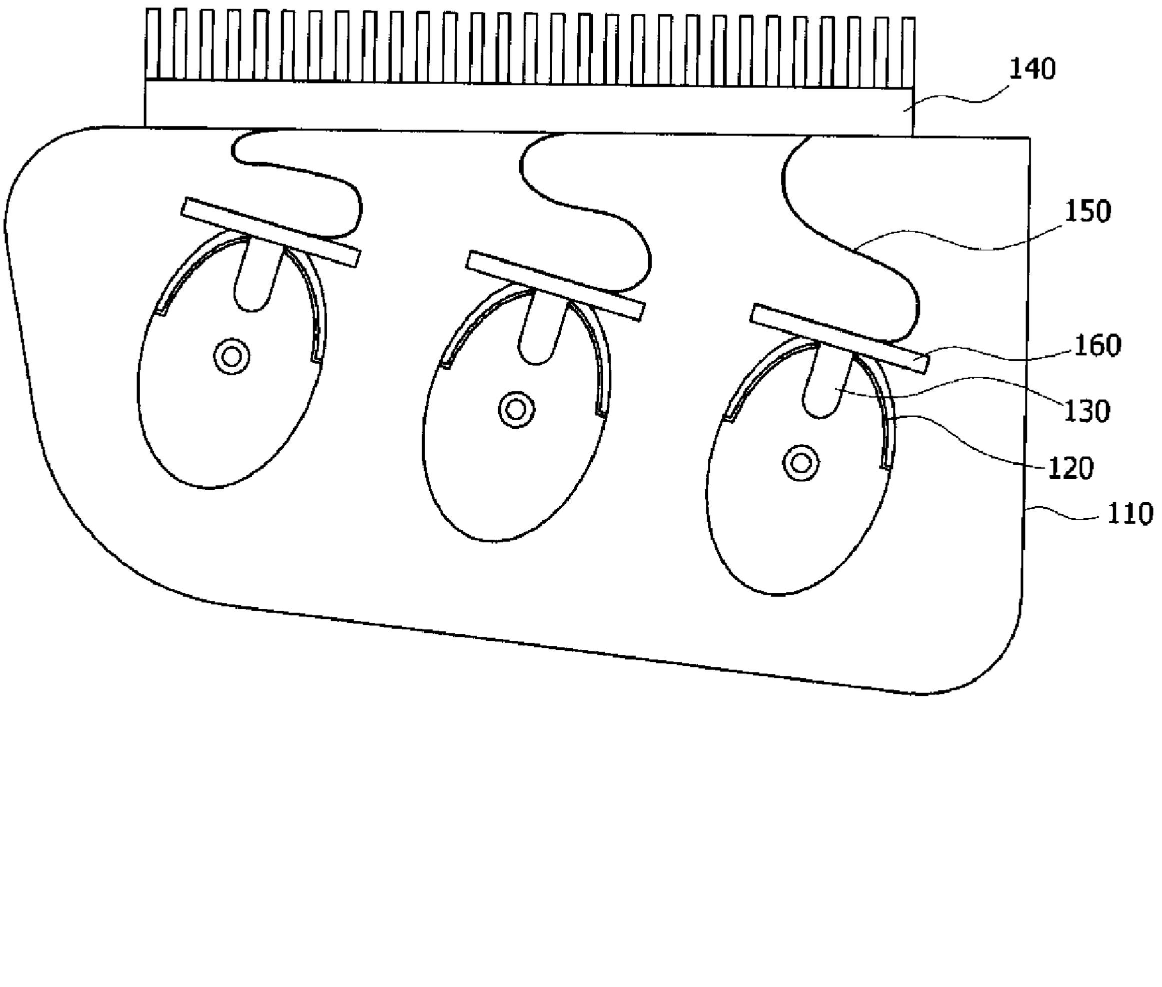
FIG. 4 is a schematic view illustrating the heat sink structure of another exemplary AFLS according to the present invention.
Figure 5:
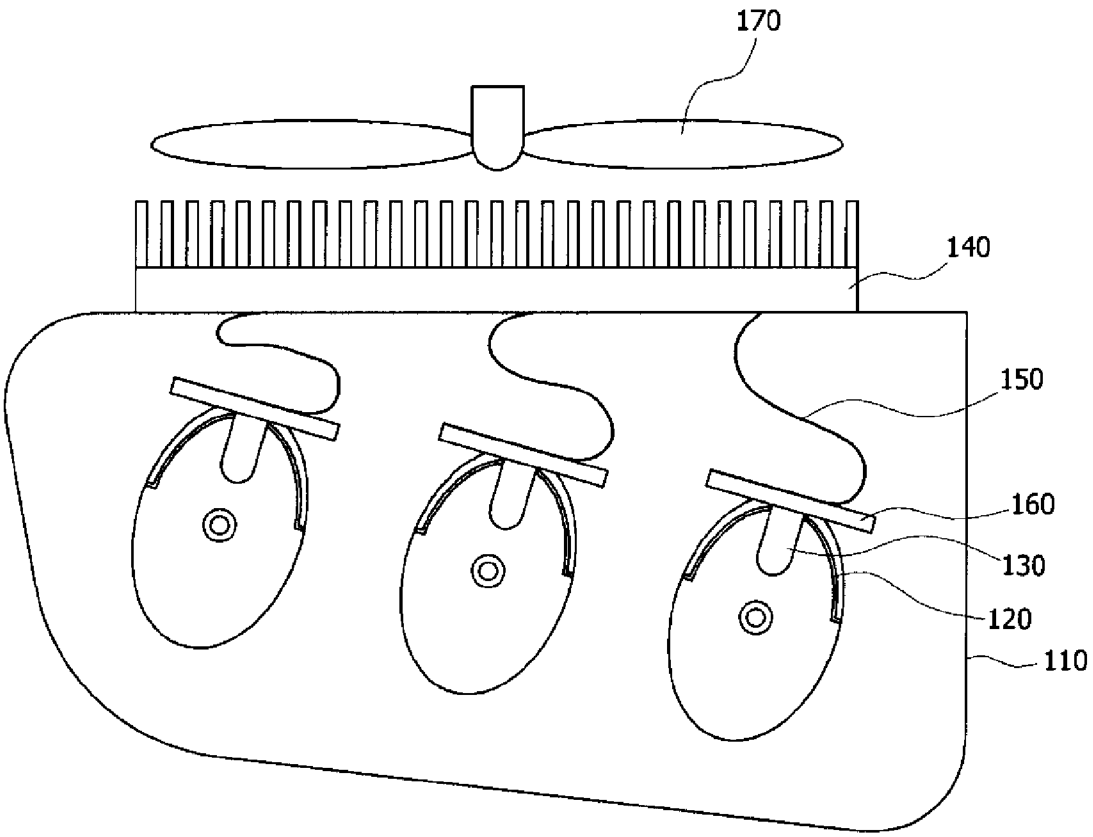
FIG. 5 is a schematic view illustrating the heat sink structure of another exemplary AFLS according to the present invention.

FIG. 2 is a schematic view illustrating the heat sink structure of an adaptive front light system (AFLS) according to an exemplary embodiment of the present invention; FIG. 3 is a perspective view illustrating the structure of a heat conduction member according to the present invention; FIG. 4 is a schematic view illustrating the heat sink structure of an AFLS according to another exemplary embodiment of the present invention; and FIG. 5 is a schematic view illustrating the heat sink structure of an AFLS according to still another exemplary embodiment of the present invention.

Referring to FIG. 2 and FIG. 3, the adaptive front lighting system (AFLS) of the present invention generally includes a lamp housing 110, a reflector 120, a light source 130, an external heat sink 140, and a heat conduction member 150.

As illustrated, the lamp housing 110 is formed to house other components therein to protect them from outside. In detail, the lamp housing 110 is firmly sealed such that the interior thereof cannot communicate with the exterior thereof, thereby preventing foreign objects such as dust and moisture from entering.

Further, the reflector 120 is installed in the lamp housing 110 so as to rotate around a rotational axle 121 and the reflector 120 is configured to reflect lights generated from the light source 130, which will be described below, to travel towards the front portion of a vehicle.

Here, the reflector 120 is designed to rotate around the rotational axle 121 in leftward/rightward or upward/downward directions and this is because the illumination angle of a headlight needs to change according to the driving conditions of the vehicle, as described in the related art.

Namely, in the AFLS, the reflector 120 rotates in the leftward/rightward direction according to the steering angle of a steering wheel and also rotates upward/downward direction according the height of the front portion of the vehicle and the rotational axle 121 is provided for the leftward/rightward or upward/downward movement of the reflector 120.

Meanwhile, the light source 130 installed on the reflector 120 is configured to emit light, which is in turn reflected by the reflector 120, and then travels towards the front portion of the vehicle.

The light source 130 can be constructed with various elements such as a bulb or a light emitting diode (LED). While the present invention is implemented with the LED, it is not necessarily limited to the LED.

Here, since the light source 130 is installed on the rotational reflector 120, the light source 130 also moves together with respect to the rotational axle 121 when the reflector 120 moves.

The external heat sink 140 is installed in the lamp housing 110 and is provided with a plurality of heat sink fins 141, which is spaced apart from each other at regular intervals in order to increase the surface area contacting the outside for the purpose of more effective heat dissipation.

Further, when the light source 130 emits the light, high temperature heat is generated. The heat conduction member 150 is provided to connect the light source 130 with the external heat sink 140 so as to transfer the generated heat from the light source 130 to the external heat sink 140.

As illustrated in FIG. 2, the heat conduction member 150 connects the light source 130 with the external heat sink 140 and needs to be smoothly transformed in response to the movements of the reflector 120 and the light source 130.

In other words, the heat conduction member 150 needs to be made of a flexible material and to connect the light source 130 with the external heat sink 140 so as not to disturb the movements of the reflector 120.

Thus, the heat from the light source 130, which moves together with the reflector 120, is transferred to the external heat sink 140 through the heat conduction member 150 and the heat can be efficiently dissipated.

Here, the heat conduction member 150 can be made of various materials such as aluminum, copper and carbon, which are excellent heat conductive materials. In addition, the heat conduction member 150 can be additionally coated with excellent thermal conductivity materials such as carbon nanotube (CNT) and graphene in order to increase the heat conductivity. Although this material can be properly selected according to the user's need, it would be understood that this application is within the scope and spirit of the present invention regardless of its kind as long as the material is a kind of heat conductive materials.

However, the heat conduction member 150 is built to be flexibly changed. Thus, the heat conduction member 150 can be made of various kinds of wires; can be a multi-layered panel formed with more than one metal straps at least as shown in FIG. 3; and also can be formed with various kinds of chains or belt types.

Here, the various kinds of wires include a single strand of wire and a rope of multi-strands with more than two wires.

At this time, the heat conduction member 150 can be easily bent as a wire-type and the movement of the reflector 120 can be more flexible. However, since the wire-type heat conduction member 150 is not high heat conductive because of the limited cross section thereof, it may be preferable to increase the heat conductivity and design the heat conduction member 150 not to disturb the movement of the reflector 120 with flexibly bendy structure by using the multi-layered metal strap with more than one at least, which have bigger cross section, as shown in FIG. 3.

Up to now, the heat conduction member 150 has been described as being directly connected with the light source 130. More preferably, the light source 130 can be directly connected with an internal heat sink 160 by installing separate internal heat sink 160 on the light source 130; and by linking the internal heat sink 160 and the external heat sink 140 with the heat conduction member 150, the heat of the light source 130 can be transferred to the internal heat sink 160 and be firstly dissipated into the internal heat sink 160, and then the residual heat can be transferred to the external heat sink 140 via the heat conduction member 150 so as to be secondly and consequently dissipated outside.

Further, as illustrated in FIG. 2, one reflector 120 and one light source 130 can be mounted in one lamp housing 110. However, as illustrated in FIG. 4, at least two reflectors 120, light sources 130, and heat conduction members 150 can be installed in one lamp housing 110. In this case, those two heat conduction members 150 can be connected to the corresponding external heat sinks 140. Desirably, as in FIG. 4, the two or more heat conduction members 150 can be connected with one external heat sink 140 by enlarging the size of the external heat sink 140.

As illustrated in FIG. 5, a cooling fan 170 can be installed outside of the external heat sink 140 in order to increase the cooling efficiency of the external heat sink 140.

The cooling fan 170 promotes the heat dissipation of the external heat sink 140 so that the heat dissipation efficiency of the light source 130 can be more excellent.

Furthermore, it is desirable to increase the heat conduction efficiency at the contact surfaces of the two metals by spreading out thermal compound, as referred to a thermal grease or thermal pad, on the contact surfaces of the internal heat sink 160 and the heat conduction member 150 and the contact surfaces of the heat conduction member 150 and the external heat sink 140.

For convenience in explanation and accurate definition in the appended claims, the terms "front", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. An adaptive front lighting system having high heat-dissipation efficiency, comprising:

a lamp housing;

a reflector installed in the lamp housing and rotatable around a rotational axle formed at the lamp housing;

a light source installed in the reflector to emit light;

an external heat sink installed at an external surface of the lamp housing so as to dissipate heat towards outside of the lamp housing; and a heat conduction member connecting the light source and the external heat sink so as to transfer heat of the light source to the external heat sink, wherein the heat conduction member is flexibly transformed in response to a movement of the reflector and the light source, and the heat conduction member comprises a wire or wires.

2. The adaptive front lighting system according to claim 1, wherein the light source includes an internal heat sink.

3. The adaptive front lighting system according to claim 2, wherein the light source includes a light emitting diode.

4. The adaptive front lighting system according to claim 2, further comprising thermal compound portions applied to contact surfaces of the internal heat sink and the heat conduction member and to contact surfaces of the heat conduction member and the external heat sink.

5. The adaptive front lighting system according to claim 1, wherein the lamp housing accommodates two or more of the reflectors, two or more of light sources, and two or more of heat conduction members, and the two or more heat conduction members are connected to one of said external heat sinks.

6. The adaptive front lighting system according to claim 5, further comprising a cooling fan installed outside said one external heat sink.

7. The adaptive front lighting system according to claim 1, wherein the heat conduction member is coated with either carbon nanotubes or graphene having high thermal conductivity.

8. The adaptive front lighting system according to claim 7, further comprising thermal compound portions applied to contact surfaces of the internal heat sink and the heat conduction member and to contact surfaces of the heat conduction member and the external heat sink.

9. The adaptive front lighting system according to claim 1, wherein the external heat sink is formed with a fin so as to dissipate heat towards outside of the lamp housing.

10. The adaptive front lighting system according to claim 1, wherein the heat conduction member is made of aluminum, copper or carbon.

11. The adaptive front lighting system according to claim 1, wherein the light source includes an internal heat sink, wherein one end of the internal heat sink is connected with the heat conduction member and the other end of the internal heat sink is connected with the light source.

12. The adaptive front lighting system according to claim 1, further comprising thermal compound portions applied to contact surfaces of the heat conduction member and the external heat sink.

13. An adaptive front lighting system having high heat-dissipation efficiency, comprising:

a lamp housing;

a reflector installed in the lamp housing and rotatable around a rotational axle formed at the lamp housing;

a light source installed in the reflector to emit light;

an external heat sink installed at an external surface of the lamp housing so as to dissipate heat towards outside of the lamp housing; and a heat conduction member connecting the light source and the external heat sink so as to transfer heat of the light source to the external heat sink, wherein the heat conduction member is flexibly transformed in response to a movement of the reflector and the light source, and the heat conduction member comprises a chain and belt shapes.

* * * * *